Dec. 16, 1941. W. J. WACHOWITZ 2,266,134
COOLING TANK
Filed Feb. 24, 1941 3 Sheets-Sheet 1
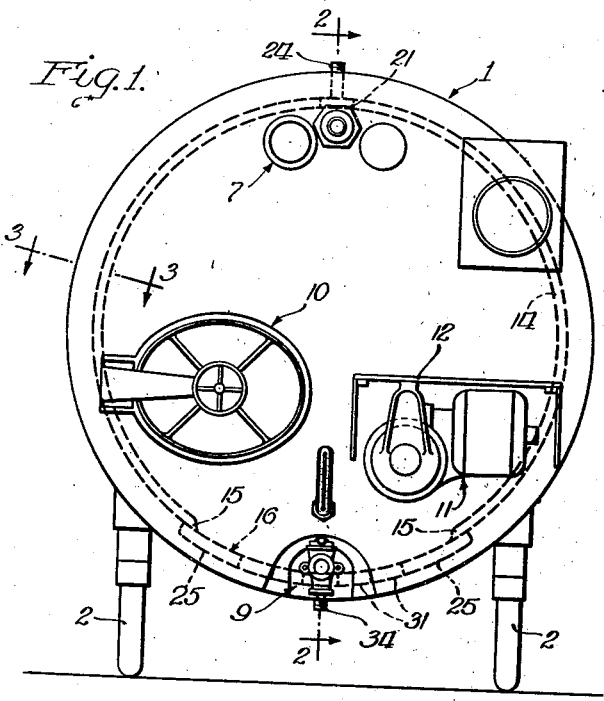
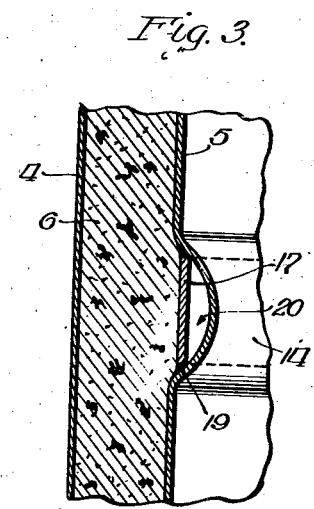
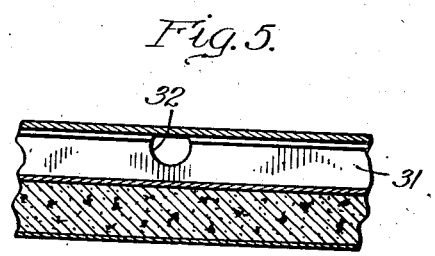
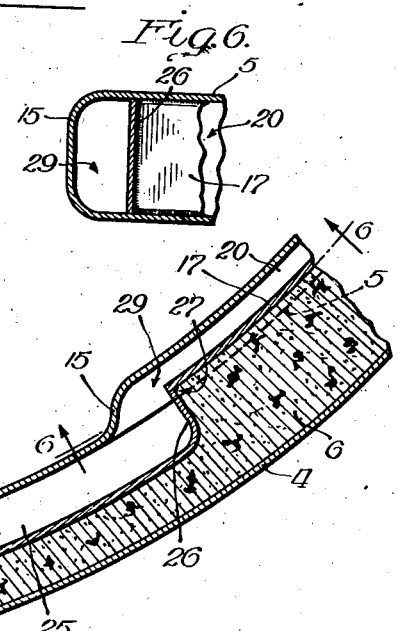
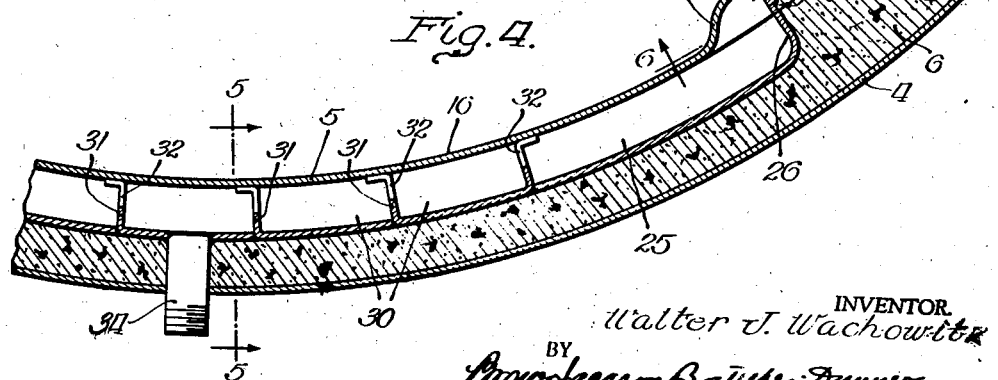
INVENTOR.
Walter J. Wachowitz
BY Dec. 16, 1941.   W. J. WACHOWITZ   2,266,134
COOLING TANK
Filed Feb. 24, 1941   3 Sheets-Sheet 2
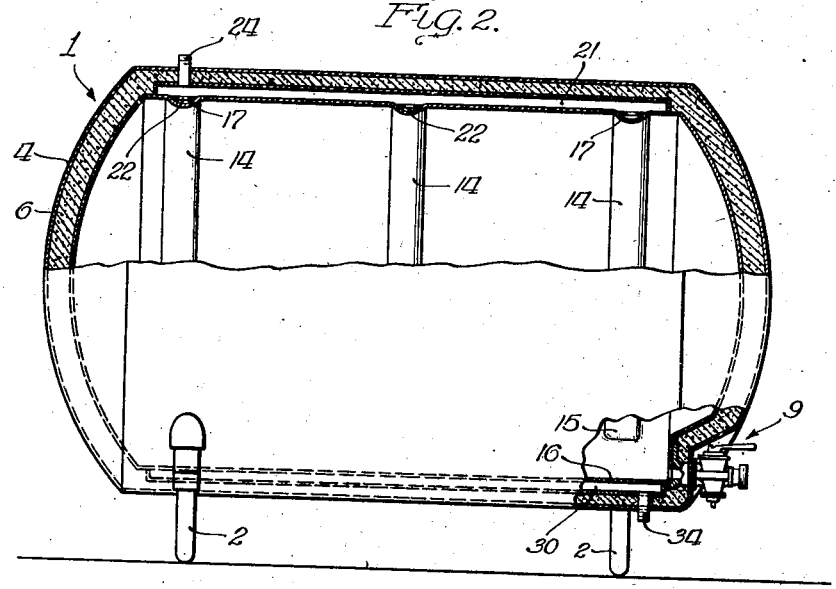
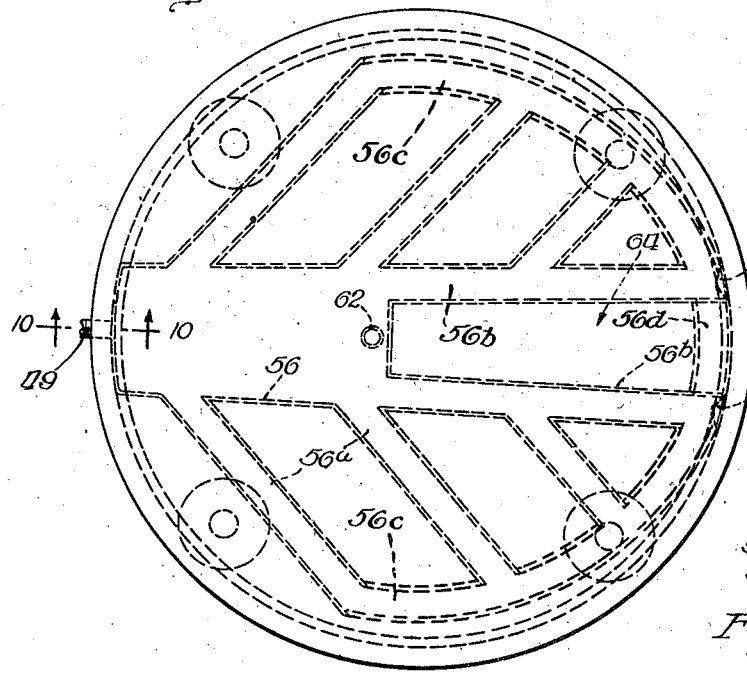
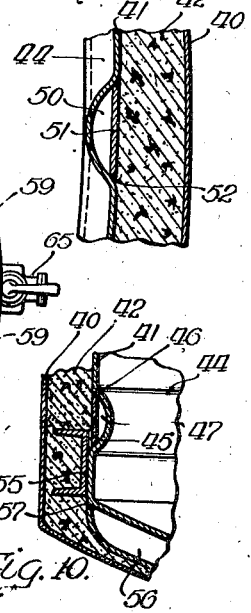
INVENTOR.
Walter J. Wachowitz
BY
Attys.

Dec. 16, 1941.  W. J. WACHOWITZ  2,266,134
COOLING TANK
Filed Feb. 24, 1941  3 Sheets-Sheet 3

INVENTOR.
Walter J. Wachowitz
BY
Attys.

Patented Dec. 16, 1941

2,266,134

UNITED STATES PATENT OFFICE 2,266,134

COOLING TANK

Walter J. Wachowitz, Waukesha, Wis., assignor to Alloy Products Corp., Waukesha, Wis., a corporation of Wisconsin Application February 24, 1941, Serial No. 380,091

7 Claims. (Cl. 257—208)

The present invention relates to cooling tanks, and particularly tanks for handling milk and milk products.

It is essential that tanks for handling milk and milk products be free of cavities, sharp corners and projections such as would provide lodgment and breeding places for bacteria. It is also necessary that the tanks be so constructed that they can be easily drained, cleaned, and sterilized.

The tank of the present invention is insulated against heat and, for purposes of cooling the contents, is provided at spaced intervals with channels for flow of a refrigerant. Certain of the refrigerant channels are in the form of evenly rounded grooves pressed inwardly in the wall of the container and closed at their outer side by strips welded therein. Other refrigerant channels are in the form of channel members at the exterior of the lower portion of the container body, effective for reinforcing the latter while facilitating draining and washing of the interior of the container. The welded areas consequently are not exposed to the milk.

Other objects and advantages of the invention will appear from the following description taken in conjunction with the accompanying drawings in which:

Figure 1 is a front view of a horizontal tank embodying my invention;

Figure 2 is a view partly in section taken substantially on line 2—2 of Figure 1, and partly in elevation with certain parts broken away and certain other parts shown in elevation;

Figure 3 is a sectional view taken substantially on line 3—3 of Figure 1, on an enlarged scale;

Figure 4 is a cross sectional view of the lower portion of the tank of Figure 1, on an enlarged scale;

Figure 5 is a sectional view taken substantially on line 5—5 of Figure 4;

Figure 6 is a sectional view taken substantially on line 6—6 of Figure 4;

Figure 8 is a plan view of the tank of Figure 7;

Figure 9 is a sectional view taken substantially on line 9—9 of Figure 7, on an enlarged scale;

Figure 10 is a sectional view of the lower portion of the tank taken substantially on line 10—10 of Figure 8, on an enlarged scale;

Figure 7:
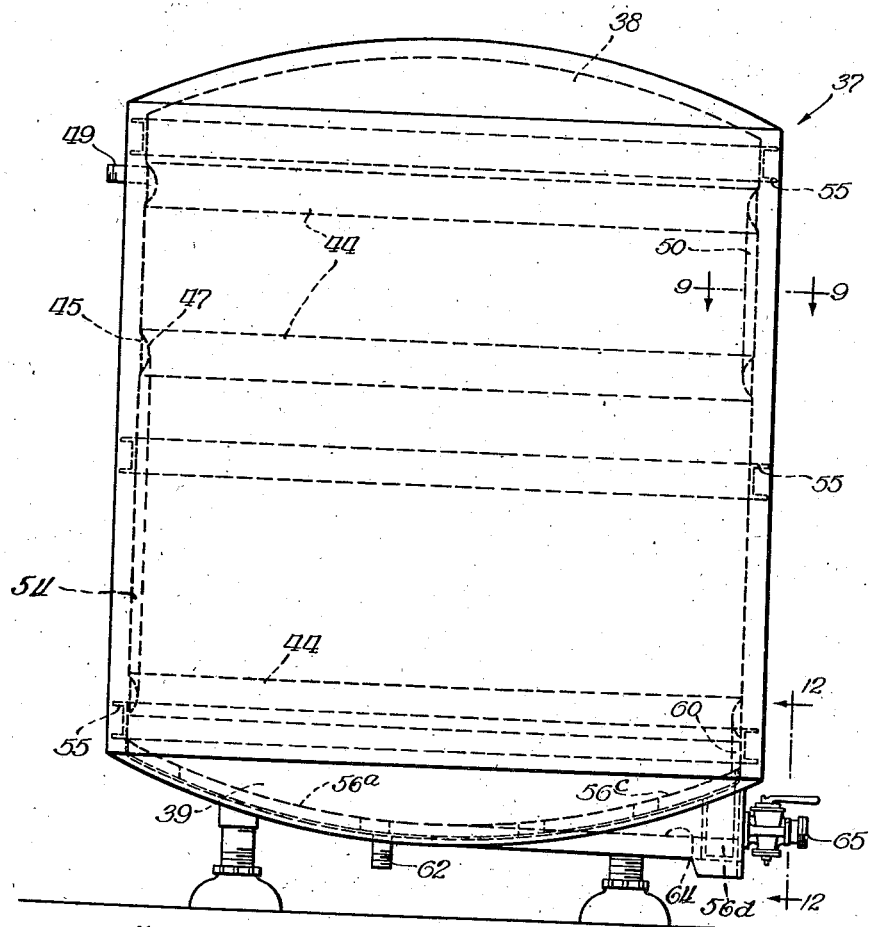
Figure 7 is an elevational view of a vertical tank embodying my invention.
Figure 12:
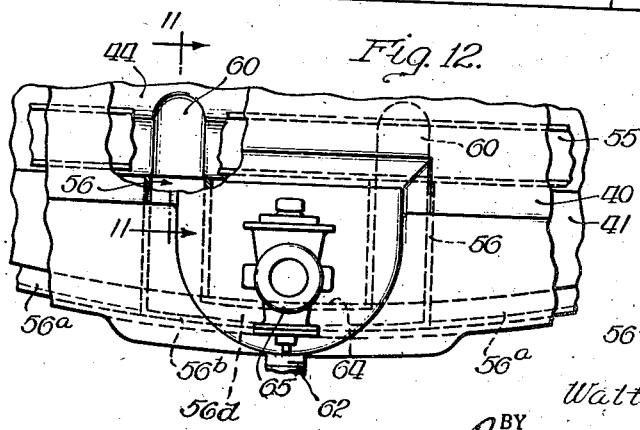
Figure 12 is a view of the lower portion of the tank of Figure 7 as indicated by the line 12—12, with parts thereof in elevation and other parts broken away and in section, on an enlarged scale.
Figure 11:
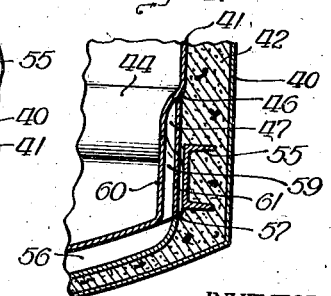
Figure 11 is a sectional view taken substantially on line 11—11 of Figure 12.

Referring in detail to the drawings, one form of cooling tank is shown in Figures 1 to 6, inclusive. This form comprises a horizontally disposed tank 1 supported on legs 2. The structure of the tank comprises an outer metal covering 4 and a container 5 between which is a mass of cork 6 or other suitable insulating material. A fitting 7 and a valve controlled fitting 9, both of which may be of suitable known type, are provided for filling and draining the container. A manhole 10, provided with appropriate closure means of known type, gives access to the container when it is empty. A motor and gearing 11 are mounted on a bracket 12 and coupled with a suitable impeller within the container for agitating or stirring the milk.

As shown in Figure 2, a plurality of longitudinally spaced grooves 14 are pressed in the body of the container 5 inwardly thereof. These grooves are of rounded cross section and present smooth surfaces of considerable area to the milk in the container. The grooves 14 are disposed circumferentially of the container, extend over the top thereof and terminate at points 15 near the bottom. That leaves a space 16 of considerable width, at the lower interior portion of the container clear and unobstructed so that the milk may be completely drained therefrom through the outlet fitting 9, while also providing adequate drainage for washing solution and water used in cleaning the interior of the container. The outer sides of grooves 14 are closed by strips 17 welded in the grooves at 19, forming therewith fluid-tight and pressure resistant channels 20. A header 21, in the form of a channel member and provided with a nipple 24, is welded to the outer side of container 5 at the top thereof and communicates with the channels 20, through openings 22 in closure strips 17, for the flow therethrough of refrigerant.

Each of closure strips 17 terminates a short distance from each end of its associated groove 14, providing a passage 29 opening outwardly from the channel 20. A connector 25 of channel cross section, open at its lower end and closed at its upper end by a wall 26, is welded to the exterior lower portion of container 5, with wall 26 welded to strips 17a at 27 so that the upper portion of connector 25 underlies passage 29 in free communication therewith, as shown in Figure 4. At its lower end connector 25 is welded to the outer side of the outer one of a plurality of channel members 31 welded to each other and to the exterior lower portion of container 5 lengthwise thereof, together and with the wall of container 5 defining channels 30 for flow of refrigerant. Channel members 31 are provided with openings 32 extending from the upper edges of their lateral flanges or arms. A connector 25 is provided at each end of each channel 20, as will be clear from Figure 1, and communicates at its lower end with the adjacent channel member 31 through an opening 32. The channel members 31 are closed at their ends, as will be understood. A nipple 34 is welded to the central channel member 31, adjacent the forward end thereof and in free communication therewith. The connectors 25 and channel members 31 provide communication between the ends of channels 20 for flow of refrigerant therethrough, while also providing an extensive cooling area at the lower portion of container 5 and effective reinforcement therefor, leaving the lower interior portion of container 5 unobstructed for ready drainage and washing.

A vertical cooling tank is shown in Figures 7 to 12, inclusive. Its construction is, in general, similar to that of the horizontal tank. It comprises an outer metal covering 40 and a container 41, with cork 42 or other suitable insulating material disposed therebetween, container 41 having upper and lower heads 38 and 39, respectively. A plurality of rounded grooves 44 are pressed inwardly in the body of container 41 and extend the full circumference thereof. The grooves 44 are closed at their outer sides by strips 45 welded therein and forming therewith channels 47. As shown in Figure 7, three channels 47 are provided but the number thereof may be varied. The channels 47 completely encircle the container and are spaced apart vertically.

The first or top channel 47 is provided at one side with a nipple 49 and communicates at its opposite side with the second channel by means of a vertical channel 50. The channel 50 is formed similarly to channels 47, that is, a rounded groove is pressed inwardly in the container and is closed at its outer side by a strip 51 welded therein at 52. A channel 54, pressed inwardly in the container similarly to channel 50, and closed by a strip similarly to the latter channel, interconnects the intermediate channel 47 at the side thereof opposite to channel 50, to the lowermost channel 47 for flow of refrigerant from one to the other thereof. A plurality of reinforcing channel members 55 are welded around container 41 at spaced intervals.

A main channel member 56 (Figure 8), and supplementary channel members 56a opening at their inner ends into member 56, are welded at 57 to the underface of lower head 39. Member 56 is divided for a portion of its length, providing two forwardly extending arms 56b, each connected at its forward end to the lowermost channel 47 by a vertical channel 59. The outer ends of supplementary channel members 56a and the forwardly extending arms 56b of the main channel member 56 are interconnected by channel members 56c, and the forwardly extending arms 56b are interconnected by a channel element 56d forming a continuation of channel members 56c. Each of channels 59 is formed by a vertical groove 60 pressed inwardly in the body of container 41 and closed at its outer side by a strip 61 welded therein and to the upper edge of the forward end wall of the corresponding arm 56b of the bottom channel member 56. The channel members 56, 56a, 56b, 56c, and 56d provide an interconnected channel network for flow of refrigerant, thus providing an extensive cooling area at the bottom of the tank while also serving as an effective reinforcement therefor. The channel 60 is at the opposite side of the container from the channel 54. A nipple 62 is welded to channel member 56, adjacent the lowermost point thereof and in free communication therewith. The lower head 39 is provided with a drainage trough 64 inclined downwardly and outwardly from the lowest point of head 39, provided at its outer end with a valve controlled outlet fitting 65 of any suitable known type, which trough is disposed between arms 56b of channel member 56.

It will be seen that in both of the tanks above described the interior of the inner container of the tank is free of recesses or projections which could provide lodgment for bacteria and may readily be cleaned and drained, and that the welding of the refrigerant channels and associated parts is exterior of the container and, therefore, not exposed to contact with the milk. Also, the lower portion of the container is provided with a channel structure effective as a reinforcement therefor, such structure providing channels for refrigerant flow, assuring an extensive cooling area at the lower portion of the container, which is conducive to rapid cooling of the contents thereof. These tanks may be used either with a pressure cooling system, in which the refrigerant is circulated under pressure, or with an absorption system. If a pressure system is used, the nipples (24 and 34 of the horizontal tank and 49 and 62 of the vertical tank) provide suitable connections for the inlet and outlet of the refrigerant, which conveniently may be ammonia though any other suitable refrigerant may be used. If an absorption system is used, the upper nipple (24 of the horizontal tank and 49 of the vertical tank) provides a suitable connection to the refrigerant container, commonly termed a boiler, and the lower nipple (34 or 62) may be provided with a suitable valve and used for draining off the refrigerant when desired or necessary.

The horizontal tank, in addition to the fittings referred to, may be provided with such other fittings as may be desirable, including a peep fitting for viewing the interior of the container, a gauge, an ordinary thermometer, a recording thermometer, etc. It will be understood that the vertical tank is provided with a manhole and closure means therefor, a filling fitting, agitating means and such other fittings as may be desirable, the same as the horizontal tank, which have been omitted in the main in the drawings of the vertical tank as not being necessary to an understanding of my invention.

While I have shown specific embodiments of the invention, the details herein shown and described are not to be considered as limiting, but illustrative, and variations in details may be made without departing from the scope of the invention.

I claim:

1. In a tank structure of the character described, a cylindrical container comprising a body having inwardly pressed circumferential grooves of rounded cross section spaced apart lengthwise thereof, closure strips fitting in the outer portions of said grooves welded to said body, said strips and grooves defining refrigerant receiving channels, reinforcing means at the lower portion of said container exterior thereof defining refrigerant receiving channels, and means connecting said circumferential channels and said lower channels together for flow of refrigerant therethrough.

2. In a tank structure of the character described, a substantially horizontal cylindrical container comprising a body having inwardly pressed circumferential grooves spaced apart lengthwise thereof and of less extent lengthwise than the circumference of said body leaving the lower portion thereof interiorly smooth and unobstructed, closure strips fitting in the outer portions of said grooves welded to said body, said strips and grooves defining refrigerant receiving channels, reinforcing channel members welded to said lower portion of said body exteriorly thereof defining refrigerant receiving channels, and means connecting said circumferential channels and said lower channels for flow of refrigerant therethrough.

3. In a tank structure of the character described, a substantially horizontal cylindrical container comprising a body having circumferential grooves spaced apart lengthwise thereof and of less extent lengthwise than the circumference of said body leaving the lower portion thereof interiorly smooth and unobstructed, closure strips fitting in the outer portions of said grooves welded to said body, said strips and grooves defining refrigerant receiving channels, exterior reinforcing channel members welded to said lower portion of said body extending lengthwise thereof, and means connecting said circumferential channels and said lower channels for flow of refrigerant therethrough.

4. In a tank structure of the character described, a substantially horizontal cylindrical container comprising a body having circumferential grooves spaced apart lengthwise thereof and of less extent lengthwise than the circumference of said body leaving the lower portion thereof interiorly smooth and unobstructed, closure strips fitting in the outer portions of said grooves welded to said body, said strips and grooves defining refrigerant receiving channels, intercommunicating exterior reinforcing channel members welded to said lower portion of said body extending lengthwise thereof, and means connecting said circumferential channels and said lower channels for flow of refrigerant therethrough.

5. In a tank structure of the character described, a substantially horizontal cylindrical container comprising a body having circumferential grooves spaced apart lengthwise thereof and of less extent lengthwise than the circumference of said body leaving the lower portion thereof interiorly smooth and unobstructed, closure strips fitting in the outer portions of said grooves welded to said body, said strips and grooves defining refrigerant receiving channels, exterior reinforcing channel members welded to said lower portion of said body extending lengthwise thereof, means connecting said circumferential grooves and said lower channels for flow of refrigerant therethrough, and an exterior header welded to the upper portion of said body lengthwise thereof in communication with said circumferential grooves.

6. In a tank structure of the character described, a cylindrical container comprising a body and upper and lower heads therefor, said body having inwardly pressed circumferential grooves of rounded cross section spaced apart lengthwise thereof, closure strips fitting in the outer portions of said grooves welded to said body, said strips and grooves defining refrigerant receiving channels, reinforcing means welded to the under face of said lower head defining therewith communicating lower refrigerant receiving channels, and means connecting said circumferential channels and said lower channels for flow of refrigerant therethrough.

7. In a tank structure of the character described, a cylindrical container comprising a body and upper and lower heads therefor, said body having inwardly pressed circumferential grooves of rounded cross section spaced apart lengthwise thereof, closure strips fitting in the outer portions of said grooves welded to said body, said strips and grooves defining refrigerant receiving channels, reinforcing channel members welded to the under face of said lower head defining therewith communicating lower refrigerant receiving channels, and means connecting said circumferential channels and said lower channels for flow of refrigerant therethrough.

WALTER J. WACHOWITZ.